Figure 1:
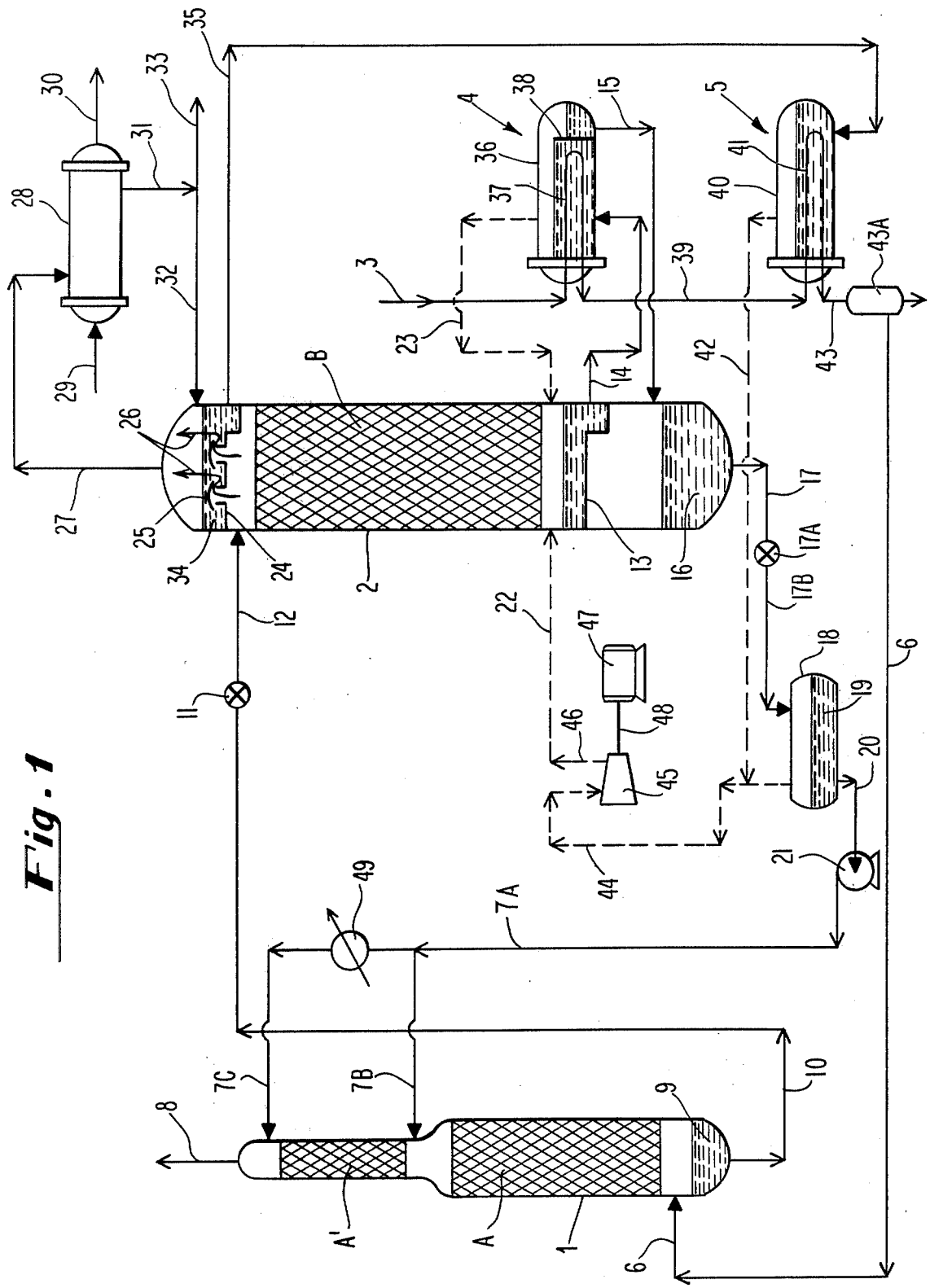

United States Patent [19]

Benson et al.

[11] 4,160,810

[45] Jul. 10, 1979

[54] REMOVAL OF ACID GASES FROM HOT GAS MIXTURES

[75] Inventors: Homer E. Benson; Donald H. McCrea, both of Pittsburgh, Pa.

[73] Assignee: Benfield Corporation, Pittsburgh, Pa.

[21] Appl. No.: 884,200

[22] Filed: Mar. 7, 1978

[51] Int. Cl.² .................................................. B01D 53/34
[52] U.S. Cl. .................................. 423/220; 423/223; 423/232; 423/228
[58] Field of Search ........ 423/222, 223, 224, 226–229, 423/232, 233, 220

[56] References Cited

U.S. PATENT DOCUMENTS

| | | | |
|---|---|---|---|
| 3,101,996 | 8/1963 | Bresler et al. | 423/229 |
| 3,288,557 | 11/1966 | Bresler | 423/229 |
| 3,823,222 | 7/1974 | Benson | 423/223 |
| 4,073,863 | 2/1978 | Giammarco et al. | 423/228 X |

*Primary Examiner*—Earl C. Thomas
*Attorney, Agent, or Firm*—William M. Epes

[57] ABSTRACT

A process for removing acid gases such as $CO_2$ and $H_2S$ from gas streams using an aqueous alkaline scrubbing solution which is circulated between an absorption and regeneration stage wherein the stripping steam for regeneration is derived at least partly from the hot feed gas to be purified. The thermal efficiency of the process is substantially improved by first heat-exchanging the hot feed gas with the scrubbing solution to raise stripping steam and then heat-exchanging the hot feed gas with water (which is preferably condensate water produced in the scrubbing process) in a second heat exchanger operating under reduced pressure, thus recovering additional low-level heat from the feed gas and producing low-pressure steam which is compressed and then utilized as additional stripping steam. In a preferred embodiment, additional low-pressure steam is generated by also flashing off low-pressure steam from the regenerated scrubbing solution and compressing this steam together with the steam produced in the second heat exchanger for use as stripping steam.

12 Claims, 2 Drawing Figures

REMOVAL OF ACID GASES FROM HOT GAS MIXTURES

BACKGROUND OF THE INVENTION AND PRIOR ART

This invention relates to an improved process for the removal of acid gases, such as $CO_2$ and $H_2S$, from hot, steam-containing gas mixtures.

The industrial importance of gas scrubbing processes involving the bulk removal of acid gases, particularly $CO_2$ and $H_2S$, from various raw gas mixtures is steadily increasing. As the demand for synthetic fuels and synthesis gases derived from fuel sources such as natural gas, oil and coal increases, there is an ever-increasing need for efficient processes for the removal of $CO_2$ and $H_2S$ from the raw gas mixtures that are generated. For example, in the production of synthetic methane from naphtha, fuel oil or coal, the starting material is subjected to reforming or partial oxidation, producing a raw gas containing e.g. from 20% to as much as 50% of $CO_2$ together with smaller amounts of $H_2S$ where a sulfur-containing starting material is employed. Likewise, in the reforming of natural gas to produce hydrogen for ammonia synthesis or hydrogenation reactions, a raw gas is produced containing usually from 16% to 20% $CO_2$, all of which must be removed prior to the ammonia synthesis step.

The acid gas-containing raw gas mixtures produced by such processes as steam-reforming and partial oxidation are at elevated temperatures (and usually at elevated pressures) and contain large amounts of steam. Good thermal efficiency demands the efficient recovery and utilization of the heat content of such raw gases. In this connection, the extent to which such heat content can be efficiently utilized to provide the energy required to remove the large quantities of acid gases they contain is a highly significant factor in determining overall energy efficiency.

In modern practice, the most widely used process for the bulk removal of $CO_2$ and/$H_2S$ from such gas mixtures involves scrubbing of the gas with aqueous alkaline scrubbing solution which is continuously recirculated between an absorption stage where the acid gases are absorbed and a regeneration stage in which the acid gases are desorbed from the solution by means of steam-stripping. For most applications, the most efficient type of such cyclic process utilizes a substantially isothermal absorption and regeneration cycle, i.e. the absorption and regeneration stages are operated at or close to the same temperature, viz. a temperature in the vicinity of the atmospheric boiling temperature of the scrubbing solution. By eliminating the heating and cooling that is required by non-isothermal processes, heat losses are greatly reduced.

In any such process, whether isothermal or non-isothermal, the major energy requirement in the process is the stripping steam for regenerating the solution, and it is accordingly highly desirable to reduce the regeneration heat requirements and/or derive such regeneration heat from heat sources that may have little or no utility for other purposes.

It is particularly desirable that maximum utilization be made of the heat content of the raw feed gas to provide the heat energy required to produce the necessary stripping steam and that such heat extracted from the raw process gas be at the lowest possible energy level so that the higher energy-level heat in the process gas can be utilized for other purposes. An efficient recovery of the low-level heat contained in the raw process gas will result in a lower-temperature feed gas to the absorption stage which, in turn, will improve the efficiency of the absorption stage.

There have been prior proposals for increasing the efficiency of heat recovery from hot, steam-containing gas mixtures which are to be treated for the removal of acid gases. See, for example, U.S. Pat. No. 3,823,222 to Homer E. Benson, issued July 9, 1974. In the process shown in that patent, the hot, steam-containing feed gas is passed in series through two heat exchangers, the first of which boils water to produce medium-pressure steam to operate a steam ejector, and the second of which raises relatively low-pressure steam in a heat exchanger where scrubbing solution is heated. The steam ejector is employed to raise additional low-pressure steam by subjecting regenerated scrubbing solution to a reduced pressure, and then to compress such low-pressure steam and inject it into the regenerator as additional stripping steam. The overall result is an enhancement in the net thermal efficiency of the process and a reduction in the amount of heat abstracted from the hot, steam-containing feed gas to produce the necessary stripping steam.

GENERAL DESCRIPTION OF INVENTION AND PREFERRED EMBODIMENTS

In accordance with this invention, a method has been discovered which is capable of still further enhancing the amount of low-level heat than can be abstracted from the hot, steam-containing feed gas and usefully converting such heat into regeneration stripping steam.

Described in its broader aspects, the invention employs a cyclic scrubbing process utilizing an aqueous alkaline scrubbing solution which is continuously recycled between an absorption stage, where the acid gases contained in the hot, steam-containing feed gas are absorbed, and a regeneration stage in which the absorbed acid gases are desorbed by steam-stripping. The stripping steam required is at least partially derived from the feed gas through a series of heat recovery steps which maximize the amount of low-level heat in the feed gas (i.e. heat available at a relatively low temperature) that can be recovered and converted to useful stripping steam. The first heat recovery step involves an indirect heat exchange between the hot feed gas and the scrubbing solution, thereby heating the scrubbing solution to its boiling point and producing steam that is utilized in the regeneration stage as stripping steam. The partially cooled hot gas is then conducted to a second heat exchanger where the gas is passed in heat-exchange relationship with water (which is preferably water condensate produced in the scrubbing process). This second heat-exchange step may be carried out by direct or indirect contact of the gas with the water. In the course of this second heat-exchange step, the water is subjected to a reduced pressure, thus lowering its boiling temperature; and the water of reduced boiling temperature is brought into heat-exchange relationship with the hot feed gas. The increased temperature differential between the water and the gas resulting from this pressure reduction and the consequent lowering of the boiling point causes further cooling of the feed gas and the transfer of greater amounts of heat from the feed gas to the water. The steam produced by heating of the water under reduced pressure is generated at a lower pressure than the pressure in the regeneration stage, and this low-pressure steam is compressed to a level at least equal to that in the regeneration stage and injected into the regenerator as stripping steam. Suitable means for producing the reduced pressure over the water in the second heat-exchange stage and for compressing the low-pressure steam produced include mechanical compressors and thermal compressors, such as steam ejectors. The feed gas leaving the second heat exchanger after heat exchange with the water of reduced boiling temperature departs at a substantially lower temperature than in prior practice, and is passed to the absorption stage for removal of its acid gas content. The net effect of this heat-exchange sequence is the recovery of substantial additional quantities of low-level heat in the feed gas and effective conversion of this low-level heat into useful stripping steam. In typical commercial applications, savings in higher-level heat from the hot gas otherwise required to produce the necessary stripping steam may range from 15% to 20%. The effective utilization of the low-level heat in the feed gas for the production of stripping steam improves the overall efficiency of heat recovery from the feed gas and preserves higher-level heat (i.e. heat available at higher temperatures) for other uses such as the raising of medium-pressure steam.

The invention has particularly valuable application to the type of scrubbing process in which the absorption and regeneration stages are carried out at or close to the same temperatures and in which the absorption occurs under substantial superatmospheric pressures of at least 100 pounds per square inch gage (psig) and typically 200 to 1000 psig, and in which the regeneration occurs at close to atmospheric pressure. Preferred scrubbing solutions are aqueous solutions of alkalie metal carbonates, particularly relatively concentrated solutions of potassium carbonate. Scrubbing processes of these preferred types are described, for example, in U.S. Pat. No. 2,886,405 of H. E. Benson et al. issued May 12, 1959.

In a particularly preferred embodiment, the system of the invention is used in combination with means for abstracting additional low-pressure steam from hot regenerated solution by reducing the pressure on the hot solution causing the production of further quantities of low-pressure steam which is compressed and injected into the regenerator as stripping steam. In such preferred embodiment, the same equipment employed for reducing the pressure on the water employed in the second heat-exchange step and for compressing the resulting low-pressure steam can also be used in producing the reduced pressure over the hot regenerated solution and compressing the low-pressure steam thus evolved.

Reference is now made to the accompanying drawings wherein FIG. 1 is a diagrammatic flowsheet which illustrates a particularly preferred embodiment of the invention wherein low-pressure steam is generated both from the water which is heat-exchanged with the hot feed gas and from the hot regenerated solution, both sources of steam being compressed and fed to the regenerator as stripping steam.

Figure 2:
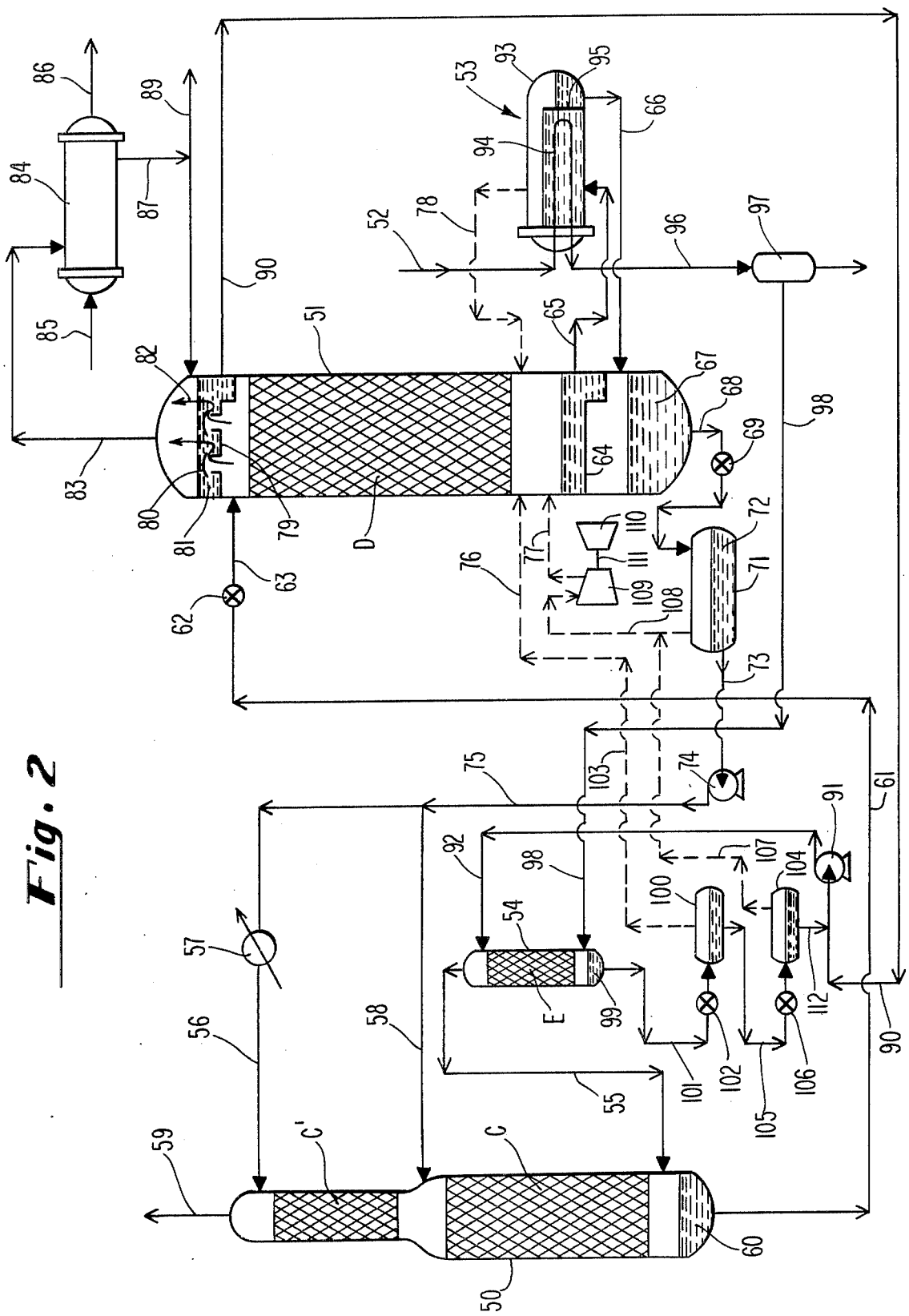

FIG. 2 is a diagrammatic flowsheet illustrating an embodiment of the invention in which the heat exchange between the hot, steam-containing feed gas and the water takes place by direct contact between the two.

Referring now to FIG. 1, the scrubbing system illustrated comprises an absorption column 1 and a regeneration column 2 between which the scrubbing solution is continuously circulated. Hot, steam-containing feed gas enters the system by line 3, passes through a first heat-exchange stage generally designated by the reference numeral 4; then through a second heat-exchange stage designated generally by the reference numeral 5 and then is conducted to the bottom of the absorption column 1 by line 6.

The absorption column 1 is suitably equipped in the cross-hatched portions designated by the letters A and A' with means for producing intimate gas-liquid contact. For such purposes, packing materials are used such as Raschig rings, Berl saddles, Intalox saddles, Pall rings or other types of packing bodies exposing a large surface of liquid to the gas flowing through the packing. In place of packing, other means such as plates e.g. sieve trays, may be employed for insuring intimate gas-liquid contact. In the regenerator 2, the cross-hatched section labelled B similarly contains packing materials or plates to insure intimate contact between the scrubbing solution and stripping steam passing through this column.

In the preferred embodiment of the invention, the absorber column is maintained at substantial superatmospheric pressures of at least 100 pounds per square inch gage (psig) and preferably at least 200 psig. Absorption pressures in typical applications of the invention will generally range from 250 to 1500 pounds per square inch.

In the absorption column, a portion of the regenerated solution, after passing through line 7A and cooler 49, is supplied to the top of the column by line 7C and flows downwardly through the gas-liquid contact section A' countercurrently to the feed gas entering the bottom of the column by line 6. Another portion of the regenerated scrubbing solution flowing in line 7A is supplied by line 7B to an intermediate level of the absorption column and mixes with solution entering the top of the column and then flows downwardly through gas-liquid contact section A countercurrently to the feed gas. Acid gases such as $CO_2$ and/or $H_2S$ contained in the feed gas are absorbed by the solution and the purified feed gas leaves the top of the tower by line 8.

The scrubbing solution containing absorbed acid gas collects at the bottom of the absorber in sump 9 and is conducted by line 10 to a pressure letdown valve 11 where the pressure in the solution is reduced to that prevailing at the top of the regenerator tower 2, and the let-down solution then flows into the top of regenerator tower 2 by line 12.

As indicated previously, the invention is applicable generally to systems using any regenerable aqueous alkaline scrubbing solution including e.g. aqueous solutions of alkali metal carbonates, particularly potassium carbonate, aqueous solutions of ethanolamines, or alkali metal phosphates. Particularly preferred are relatively concentrated potassium carbonate solutions having potassium carbonate concentrations of 15 to 45% and preferably from 20 to 35% by weight (these concentrations being calculated on the assumption that all the potassium present is present as potassium carbonate). Potassium carbonate solutions are preferably activated by the addition of additives such as amines, particularly ethanolamines, alkali metal borates such as potassium borate or sodium borate, $As_2O_3$, amino acids such as glycine or other additives which tend to increase the rates of absorption and desorption of acid gas in the potassium carbonate solution.

Particularly preferred additives for potassium carbonate solutions are the alkanolamines added in amounts ranging from 1 to 10% and particularly from 1 to 6% by weight. Diethanolamine is particularly preferred from the standpoint of cost, relatively low volatility and effectiveness.

In the regeneration column 2, the pressurized solution containing absorbed acid gases entering by line 12 is immediately freed of a portion of its content of acid gases through the reduction in pressure occurring at the top of the regeneration column. Further desorption of the acid gases is carried out in section B of the regeneration column 2 by countercurrent contact of the scrubbing solution with stripping steam introduced into the bottom of the column and rising up through the gas-liquid contact section B countercurrent to the descending solution.

The absorption and desorption reactions that occur in columns 1 and 2, respectively, are well known in the art, being described, for example, in U.S. Pat. No. 2,886,405.

The regenerated solution, stripped of most of the absorbed acid gases, is collected at the bottom of column 2 on a trapout tray 13 and is fed to the heat exchanger system designated generally by reference numeral 4 by line 14. Scrubbing solution leaves heat exchanger 4 by line 15 and is fed to the bottom of the regenerator where it collects in sump 16. The regenerated solution leaves the bottom of the regenerator column 2 by line 17 and, after passing through letdown valve 17A, is conducted by line 17B to a flashing tank 18 operating under a reduced pressure as will be described in detail below. The scrubbing solution collects at the bottom of tank 18 in sump 19, and is conducted by line 20, recycle pump 21, and line 7A to the absorber column 1. The major portion of the solution is introduced without cooling by line 7B into an intermediate level in the absorber, while a minor portion is first cooled in cooler 49 and then introduced by line 7C into the top of the absorber.

Stripping steam for regeneration of the solution is introduced into the regeneration column through lines 22 and 23, such steam being generated in a manner to be described in detail below. The stripping steam from these sources rises in column 2 countercurrently to descending scrubbing solution and the mixture of steam and desorbed gases at the top of column 2 passes through a contact tray 24 equipped with bubble caps 25 as indicated by the arrows 26. The mixture of steam and desorbed gas leaves the top of column 2 by line 27 and is conducted to a condenser 28, cooled by a cooling medium supplied by line 29 and leaving by line 30. In the condenser 28, most of the steam content of the mixture is condensed and the water condensate is withdrawn from the condenser by line 31. A portion or all of the condensate is returned to the top of column 2 by line 32. Depending on the water balance in the system, a portion of the condensate may be removed by line 33. The condensate introduced into column 2 collects on contact tray 24 as shown by reference numeral 34. The mixture of steam and desorbed gas bubbling up through condensate 34 on tray 24 heats it to a temperature of e.g. 190° F. to 210° F. The preheated aqueous condensate is fed to heat-exchanger system 5 by line 35.

Referring specifically now to heat-exchanger system 4 which provides for indirect heat exchange between the hot feed gas stream and the scrubbing solution, this includes shell 36. Regenerated scrubbing solution collecting on plate 13 is withdrawn by line 14 and introduced into the bottom of shell 36. The scrubbing solution flows over a bundle of tubes, indicated by reference numeral 37, through which hot feed gas is introduced by line 3. Heat from the feed gas is transferred through the tube bundle to the scrubbing solution, heating it to its boiling point. The steam generated passes through line 23 and is introduced into the bottom of the stripping column as stripping steam. The scrubbing solution overflows weir 38, then is withdrawn from shell 36 by line 15 and introduced into the bottom of the regenerator column 2 where it collects in sump 16. In the heat-exchanger system 4, the hot feed gas is partially cooled, yielding up a portion of its heat by indirect heat exchange with the scrubbing solution in heat exchanger 4, leaves heat exchanger 4 by line 39 and is introduced into heat-exchanger system 5. In the embodiment shown, this consists of a shell 40 supplied with aqueous condensate by line 35. The feed gas from line 39 passes through a tube bundle, shown diagrammatically and indicated by reference numeral 41, which is immersed in the aqueous condensate. In heat-exchanger system 5, the heat is transferred to the water in shell 40 through tube bundle 41 causing boiling to take place, and the steam thus generated leaves shell 40 by line 42. The hot feed gas, in passing through tube bundle 41, is further cooled and leaves heat-exchanger system 5 by line 43. After passing through a knockout pot 43A or similar device for removing condensed water, the cooled feed gas is introduced into the bottom of the absorber through line 6.

In order to enhance heat recovery from the hot, steam-containing feed gas and produce additional useful stripping steam, the boiling temperature of the water in shell 40 is reduced by connecting shell 40 through line 42 and line 44 to the suction side of a mechanical compressor 45 which reduces the pressure over the water in shell 40 to a pressure lower than that prevailing in the bottom portion of regeneration column 2, thus correspondingly lowering the boiling temperature of the water in shell 40. The effect of this pressure reduction and consequent lowering of the boiling point increases the temperature differential between the hot feed gas flowing in tube bundle 41 and the water, thereby making it possible to transfer more heat from the hot gas (which is generally at this point saturated with steam). The increased heat recovery from the hot feed gas generates additional amounts of low-pressure steam. This low-pressure steam is converted into useful stripping steam by compressing the steam in compressor 45 to a pressure at least equal to that prevailing in the bottom of the regenerator. The compressed steam leaves compressor 45 by line 46 and is introduced into the bottom of regenerator column 2 by line 22. Compressor 45 in the embodiment shown is driven by an electric motor 47 connected to the compressor by shaft 48. Alternate drives for the compressor 45 may, of course, be used, such as a steam turbine drive.

In the embodiment shown in FIG. 1, the compressor 45 is utilized not only to generate low-pressure steam by reduction of the pressure over the boiling water in heat-exchanger system 5, but is also employed to produce additional low-pressure steam by reducing the pressure over hot regenerated solution which is fed into flash tank 18 through line 17. The solution leaving the bottom of regenerator column 2 may typically be at a temperature of 248° F. or more, and upon reduction of the pressure over the solution, substantial quantities of low-pressure steam may be obtained. Flash tank 18 is connected to the suction of compressor 45 by line 44, and the mixture of flashed steam from heat exchanger 5 and the steam flashed from flash tank 18 flows by line 44 into the compressor 45 and, after compression, flows by lines 46 and 22 into the bottom of the regenerator 2 to provide stripping steam. The flashing of steam in tank 18 results in cooling of the solution and the solution leaving tank 18 by line 20 for recycle to the absorber is typically at a temperature of 10° F. to 30° F. lower than the temperature of the solution leaving the bottom of the regeneration column.

The conservation of heat by operation in accordance with the invention is particularly advantageous in that not only is a substantial amount of heat recovered from the hot feed gas stream, but the heat recovered is at a low energy level (i.e. at a low temperature) which makes more higher energy-level heat in the gas stream available for other uses. In many cases, the low-level heat recovered from the feed gas stream as useful stripping steam in accordance with the invention is at too low an energy level to be recovered economically and is wasted. The conservation of the higher-level heat in the feed gas stream is reflected by the substantial reduction in the temperature of the process gas required for providing net regeneration heat requirements for the scrubbing process.

Other important advantages of the invention include a significant reduction in the size and thus the cost of certain equipment normally employed such as a reduction in the size of the overhead condenser 28 and the solution cooler 49 in the embodiment shown in FIG. 1. These advantages result from the additional cooling of the process gas stream by heat-exchanger system 5 and the cooling of the regenerated solution by flashing in flash tank 18. A further advantage of cooling the process gas stream and the regenerated solution is a somewhat reduced solution temperature at the bottom of the absorber which in turn allows the solution to absorb higher quantities of acid gases ($CO_2$ and/or $H_2S$) per unit volume of circulating solution. This in turn reduces solution circulation rates, and thus reduces pumping costs, and also increases overall thermal efficiency of the process.

The above advantages of the invention are illustrated in the following detailed examples. Example 1 illustrates the invention using the system shown in FIG. 1. Example 2 illustrates the invention using the system shown in FIG. 1 except that the regenerated solution leaving the bottom of the regenerator by line 17 is fed directly to recycle pump 21 rather than passing through flash tank 18. In Example 2, accordingly, only the flashed steam generated in heat-exchange system 5 is fed to compressor 45 for compression and introduction into regenerator 2 as stripping steam. In order to illustrate the advantages of the invention compared to conventional operation, Example A is included in which all regeneration steam is provided by heat-exchanging the hot feed gas against the scrubbing solution in the heat-exchange system 4 of FIG. 1 with no stripping steam being provided by heat-exchanger system 5 or flash tank 18.

So that Example A and Examples 1 and 2 will be directly comparable, the same inlet and outlet feed gas compositions were employed and the same solution composition used. The feed gas in all cases was an ammonia synthesis gas of the following composition (dry basis):

| Component | Flow Rate in Pound Mols Per Hour | Volume % |
|---|---|---|
| $CO_2$ | 2,700 | 18.0 |
| $H_2$ | 9,000 | 60.0 |
| $N_2$ | 3,175.5 | 21.17 |
| CO | 52.5 | 0.35 |
| $CH_4$ | 37.5 | 0.25 |
| Argon | 34.5 | 0.23 |
| TOTALS | 15,000 | 100.00 |

In each case the feed gas was saturated with steam at the temperature entering heat-exchanger system 4 and enters the system at a pressure of 410 psia (pounds per square inch absolute).

In each case the $CO_2$ content of the feed gas was reduced to 0.1% by volume leaving the absorber. The solution composition in each case was an aqueous solution of potassium carbonate containing 30% by weight of $K_2CO_3$ (assuming all carbonate present is present as $K_2CO_3$) and 3% by weight of diethanolamine. The absorption and regeneration columns were of the same size and contained the same volume and type of tower packing. In each case the absorber pressure was 400 psia and the pressure at the bottom of the regenerator was 24.7 psia. The portion of the scrubbing solution entering the top of the absorber in each case was 25% of the total circulating solution and was cooled in each case to 158° F. in cooler 49 before introduction into the top of the absorber. The main portion of the circulating solution (75%) entered by line 7B at an intermediate level of the absorber. The solution temperature leaving the bottom of the regenerator was in each case 248° F.

In Example 1, employing both heat-exchanger system 5 and flash tank 18, the pressure above the boiling water in shell 40 and the pressure above the regenerated solution in flash tank 18 was reduced to 15 psia in contrast to the pressure of 24.7 psia prevailing at the bottom of the regenerator column 2. At the 15 psia pressure prevailing in shell 40, the boiling temperature of the water was reduced to 213° F., and the temperature of the process gas leaving heat-exchange system 5 by line 43 was 231° F. At the 15 psia pressure prevailing in flash tank 18, the temperature of the solution was reduced from 248° F. entering the tank to 220° F. leaving the tank due to the endothermic steam flashing. Under these conditions steam was evolved at the rate of 23,260 pounds per hour from heat-exchange system 5 while 54,105 pounds per hour of steam was evolved from the solution in flash tank 18. The combined low-pressure steam from these two sources entered the suction side of compressor 45 and, after compression in the pressure prevailing at the bottom of regenerator column 2, was fed into the column by line 22. In Example 1 an additional 68,315 pounds per hour of steam was generated in heat-exchanger system 4 and introduced into the bottom of the regenerator as stripping steam. In Example 2, using heat-exchanger systems 4 and 5 but not flash tank 18, the pressure in shell 40 was reduced to 15 psia and 23,260 pounds per hour of steam was evolved which was compressed in compressor 45 and fed into the bottom of the regenerator, while an additional 124,737 pounds per hour of stripping steam was required from heat-exchanger system 4. In Example A, where all stripping steam was generated in heat-exchange system 4, 151,050 pounds per hour of stripping steam was required from that source.

Table I below summarizes the results of Examples 1 and 2 and comparative Example A. In all cases the regeneration heat required is expressed in millions of BTU per hour (MM BTU/hr.) assuming a pound of steam is equivalent to 950 BTU.

TABLE I

|  | Example A | Example 1 | Example 2 |
|---|---|---|---|
| Regeneration heat generated by heat-exchange system 4, MM BTU/hr. | 143.5 | 64.9 | 118.5 |
| Regeneration heat generated by heat-exchange system 5, MM BTU/hr. | — | 22.1 | 22.1 |
| Regeneration heat generated in flash tank 18, MM BTU/hr. | — | 51.4 | — |
| Total regeneration heat required, MM BTU/hr. | 143.5 | 138.4 | 140.6 |
| Temperature of feed gas at inlet to heat-exchange system 4, °F. | 362.1 | 325.7 | 352.5 |
| Heat saved in hot feed gas for other uses, MM BTU/hr. | — | 78.6 | 25.1 |
| Heat saved as a percentage of total regeneration heat | — | 54.8 | 17.5 |
| Cooling duty of cooler 49, MM BTU/hr. | 45.2 | 29.0 | 43.9 |
| Cooling duty of overhead condenser 28, MM BTU/hr. | 130.1 | 71.3 | 110.0 |
| Solution circulation rate, gallons per minute | 4310 | 3960 | 4185 |

The advantages of the invention are apparent from Table I. The principal advantage is the amount of heat saved in the hot feed gas and made available for other uses. In Example 1 where heat-exchange system 5 and flash tank 18 are used in combination, the heat saved in the hot feed gas compared to Example A is 78.6 MM BTU/hr., equivalent to 82,737 pounds per hour of steam. The heat saved in the hot feed gas is reflected by the lower temperature at which the hot feed gas enters the heat-exchange system to provide the necessary regeneration heat requirements. In Example A, using the conventional heat-exchange system 4, the temperature of the hot, steam-saturated feed gas entering the system is 362.1° F., while in Example 1 the inlet temperature of the steam-saturated feed gas to the heat-recovery system is reduced to 325.7° F. This means that, in Example 1, the sensible and latent heat content of the feed gas stream between the temperatures of 325.7° F. and 362.1° F. (equivalent to 78.6 MM BTU/hr.) is available for other uses. The 78.6 MM BTU/hr. of higher-level heat thus saved is equivalent to 54.8% of the total regeneration heat requirements of the conventional system of Example A. In Example 2, using heat-exchange systems 4 and 5 but without flashing of the regenerated solution, the amount of heat saved in the hot feed gas is smaller but still highly significant, amounting to 25.1 MM BTU/hr., a heat savings equivalent to 17.5% of the total regeneration heat requirements of the conventional system of Example A.

A further advantage of the invention is that the total regeneration heat required (and the corresponding amount of stripping steam necessary) is significantly reduced. While the total regeneration heat requirements in Example A is 143.5 million BTU per hour, in Examples 1 and 2 the total requirement is reduced to 138.4 and 140.6 million BTU/hour, respectively. Still further advantages are substantial reductions in the size of the solution cooler (cooler 49 in FIG. 1) and in the size of the overhead condenser (condenser 28 in FIG. 1) as well as the solution circulation rate (thus reducing pump size and pumping energy), all as shown in Table I. Thus, not only does the invention substantially enhance the thermal efficiency of the process by increasing the recovery of heat from the hot feed gas stream; but, at the same time, it provides substantial savings in capital cost for the gas scrubbing plant as a whole.

Reference is now made to FIG. 2 which illustrates an embodiment of the invention similar to that shown in FIG. 1 except that the heat-exchange system 5 (where the heat from the process gas is transferred indirectly to the water) is replaced by a heat-exchange system in which the heat exchange between the hot steam-containing feed gas and the water takes place by direct contact between the two. In FIG. 2, the scrubbing solution is continuously circulated between an absorption column 50 and a regeneration column 51. Hot, steam-containing feed gas enters the scrubbing system by line 52 and passes first through a heat-exchange system generally designated by the numeral 53. It then passes through a direct-contactor column 54 where it is brought into direct contact with water circulating through column 54 after which it is conducted to the bottom of the absorption column by line 55.

The absorption column 50 is suitably equipped in the cross-hatched portions designated by the letters C and C' with means for producing intimate gas-liquid contact as in column 1 described in FIG. 1. In the regenerator column 51, the cross-hatched section D similarly contains means for producing intimate contact between the scrubbing solution and the stripping steam passing through this column.

The regenerated solution from regenerator 51 is introduced into the absorber 50 in two streams. A minor portion (usually 15 to 35% of total circulating solution) is introduced into the top of the column through line 56 after passing through cooler 57. The major portion of the regenerated solution is introduced into the absorber at an intermediate level through line 58. The feed gas, containing the acid gases such as $CO_2$ and/or $H_2S$ to be removed, is introduced into the bottom of the absorber column by line 55 and rises countercurrently to the descending scrubbing solution and the purified gas leaves the top of absorption column 50 by line 59.

The scrubbing solution, containing absorbed acid gases, collects in a sump 60 at the bottom of the absorber and is conducted by line 61 to a pressure letdown valve 62 where the pressure on the solution is reduced to that prevailing at the top of regenerator column 51 after which the letdown solution is introduced into the top of the regenerator column by line 63.

At the top of regenerator column 51 a portion of the absorbed acid gases together with steam flashes off and the partially regenerated solution then descends through section D countercurrently to rising stripping steam introduced into the bottom of the column as will be described below.

The regenerated solution, now containing a relatively small amount of absorbed acid gases, collects at the bottom of column 51 on a trapout tray 64 and is then fed to the heat-exchanger system generally designated by the numeral 53 by line 65. Scrubbing solution leaves heat exchanger 53 by line 66 and is fed to the bottom of the regenerator where it collects in a sump 67. The regenerated solution leaves the bottom of the regenerator column by line 68 and, after passing through pressure letdown valve 69, is conducted by line 70 to a flashing tank 71 operating under a reduced pressure. The flashed solution 72 in tank 71 is then conducted by line 73, recycle pump 74 and line 75 to the absorber column 50. As previously described, the regenerated solution is split into two streams, a minor stream which is first cooled in cooler 57 and introduced into the top of the absorber by line 56, and a major stream which is introduced into the absorber at an intermediate level by line 58.

Stripping steam for the desorption of acid gases from the solution is introduced into the bottom of the stripping column 51 by lines 76, 77 and 78. The manner in which these three sources of stripping steam are generated will be described in detail below. The stripping steam introduced from these three sources rises in column 51 countercurrently to descending scrubbing solution. The mixture of steam and desorbed acid gases at the top of column 51 passes through a contact tray 79 equipped with bubble caps 80. Contact tray 79 is supplied with aqueous condensate 81 as will be described below. The mixture of steam and desorbed gases passes upwardly through the layer of aqueous condensate 81 as indicated by arrows 82, and then is removed from the top of the regeneration column by line 83, and is conducted to a condenser 84, cooled by a cooling medium supplied by line 85 and leaving by line 86. In the condenser 84 most of the steam content of the mixture is condensed and the water condensate withdrawn by line 87. A portion or all of the condensate is returned to the tray 79 at the top of the regenerator column by line 88. Depending on the water balance in the system, a portion of the condensate may be removed by line 89. The condensate, which leaves the condenser 84 at temperatures, e.g. 130° to 150° F., is heated on tray 79 by contact with the mixture of steam and desorbed gas bubbling up through the condensate to temperatures of e.g. 190° to 210° F. The preheated aqueous condensate is withdrawn from tray 79 by line 90 and is then circulated by means of pump 91 and line 92 to the top of direct-contactor column 54 where the preheated condensate is brought into direct contact with hot, steam-containing feed gas as will be described in more detail below.

Reference is now made to heat-exchanger system 53 which provides for indirect heat exchange between the hot feed gas stream and the scrubbing solution to generate stripping steam. This includes shell 93. Shell 93 is supplied with scrubbing solution collecting on tray 64 by line 65. The solution flows over a bundle of tubes designated by reference numeral 94 through which hot feed gas is introduced by line 52. Heat from the feed gas is transferred through the tube bundle to the scrubbing solution, heating it to its boiling point. The steam generated passes through line 78 and is introduced into the bottom of column 51 as stripping steam. The scrubbing solution overflows weir 95 and is then withdrawn from the shell by line 66 and introduced into the bottom of regenerator column 51 where it collects in sump 67. In heat-exchanger system 53, the hot feed gas is partially cooled, yielding up a portion of its heat by indirect heat exchange with the scrubbing solution and leaves the heat-exchanger system 53 at a reduced temperature by line 96. After passing through a knockout pot 97 for removal of condensed water vapor, it is conducted by line 98 to the bottom of direct contactor 54. The feed gas stream passes upwardly through direct contactor 54 supplied with packing, trays or other means for producing intimate gas-liquid contact in the cross-hatched portion of the column designated by the reference letter E. The upwardly rising process gas flows countercurrently to a descending stream of water introduced into the top of the direct contactor 54 by line 92. As a result of the direct contact between the hot, steam-containing feed gas and the water introduced by line 92, the water is heated, e.g. to temperatures of 245° to 260° F., with corresponding cooling of the process gas and condensation of some of its steam content. The thus cooled process gas leaving the top of direct contactor 54 is introduced by line 55 into the bottom of absorber 50.

The water heated by direct contact with the hot process gas in direct contactor 54 to temperatures e.g. of 245° to 260° F. collects at the bottom of the contactor column in sump 99. This heated water is then subjected to flashing in two stages at two different pressure levels. The first stage of flashing occurs in flash tank 100 which is operated at a pressure slightly above the pressure prevailing at the bottom of regenerator column 51. The hot water from sump 99 is introduced into flash tank 100 by line 101 after passing through pressure letdown valve 102 which reduces the pressure to that prevailing in tank 100. The steam evolved by the flashing of the solution in tank 100 is removed from the tank by line 103 and introduced into the bottom of regeneration column 51 by line 76.

The second flashing of the water heated in direct contactor 54 occurs in a second flash tank 104. The somewhat cooled water from flash tank 100 is conducted by line 105 and pressure letdown valve 106 to flash tank 104. Flash tank 104 is connected by line 107 and line 108 to the suction side of a compressor 109 which reduces the pressure above the water in flash tank 104 to a pressure lower than that prevailing at the bottom of regeneration column 51. As a result of the reduction of the pressure over the water in tank 104, further flashing of steam occurs and the evolved steam is conducted by lines 107 and 108 to the compressor 109 where it is compressed to a pressure at least slightly above that prevailing at the bottom of regenerator column 51 and then introduced into the bottom of the column by line 77 as stripping steam. Compressor 109 is driven by a steam turbine (or other suitable drive means) 110 connected to compressor 109 by shaft 111.

The water collecting in tank 104, further cooled by the endothermic steam flashing occurring in tank 104, is removed by line 112 and introduced into line 90 and then recirculated by circulation pump 91 and line 92 to the top of direct contactor column 54.

The direct contactor system described above thus includes the direct contactor column 54, flash tank 100, flash tank 104, and recirculation pump 91. Water is continuously circulated by recycle pump 91 through the direct contactor column 54 where the cooled water is brought into contact with hot process gas entering the bottom of the contactor column by line 98 whereby the process gas yields up a portion of its heat to the circulating water. The hot water thus produced is then flashed in two stages in flash tank 100 and 104, resulting in evolution of steam which is employed as stripping steam in column 51, and the cooled water being then recirculated by circulation pump 91 for renewed contact with the hot process gas stream.

In the embodiment shown in FIG. 2, the water circulating in the direct contactor system described above is generated from two sources. Some of the water is generated by condensation of the water vapor in the hot feed gas stream as it contacts the circulating water in direct contactor 54. Another portion of the water is supplied by the condensate collecting at the top of the regeneration column 51 which, after preheating on tray 79 as described above, is conducted by line 90 to recirculating pump 91. The relative proportions of the water supplied to the direct contactor system described above by condensate from the hot feed gas and condensate from the top of the regeneration column 51 will depend on the steam content in the hot feed gas and other factors affecting the overall water balance in the system. The water balance can be suitably adjusted by the amount of condensate withdrawn from the system by line 89.

The suction side of compressor 109 is also connected by line 108 to flash tank 71 fed by hot regenerated solution from the bottom of the regenerator column 1. The pressure over the regenerated solution in tank 71 is reduced to a pressure lower than that prevailing at the bottom of the regenerator, causing flashing of low-pressure steam from the solution. The flashed, low-pressure steam flows by line 108 to the suction side of compressor 109 where it is compressed to a pressure at least slightly above that prevailing at the bottom of the regenerator and is introduced by line 77 into the bottom of the regenerator as stripping steam.

The system shown in FIG. 2, wherein the indirect heat-exchanger system 5 of FIG. 1 is replaced by the direct contactor system described above, makes possible the recovery of still further amounts of heat from the hot feed gas stream since it makes possible a closer temperature approach between the feed gas stream and the water which is to be converted into stripping steam. As a result, more heat is transferred to the water which can be converted into useful stripping steam and further cooling of the process feed gas occurs which still further increases the overall efficiency of the scrubbing process.

The advantages of the system shown in FIG. 2 are illustrated by the following Example 3. The same scrubbing solution is employed as in the previous Examples as well as the same feed gas composition. As in the previous examples, the $CO_2$ content of the feed gas is reduced to 0.1% by volume leaving the absorber. The absorption and regeneration columns were of the same size and contained the same size and type of tower packing. Other conditions such as absorber and regenerator pressures, the temperature of the solution entering the top of the absorber were maintained the same such that the results of Example 3 can be directly compared to those of the previous examples.

In Example 3, the feed gas enters the system of FIG. 2 through line 52 at a temperature of 322.6° F. and a pressure of 410 psia saturated with steam. In heat-exchanger system 53, indirect heat exchange between the feed gas and the scrubbing solution produces 63,260 pounds per hour of steam which is fed into the regeneration column as stripping steam with resulting cooling of the process gas to a temperature of 265.6° F. The partially cooled process gas then enters direct contactor column 54 and is brought into direct contact with water entering the top of the column by line 92 at a temperature of 214° F. As a result of the direct contact between the feed gas and the water, the feed gas is cooled to a temperature of 223° F. leaving the top of column 54 and the water is heated to 256.6° F. leaving the bottom of column 54. The feed gas enters absorber column 50 at a temperature of 223° F. and a pressure of 404 psia.

The heated water from direct contactor 54 is introduced into flash tank 100 maintained at a pressure of 25.0 psia, slightly above the pressure of 24.7 psia prevailing at the bottom of regenerator column 51. Under these conditions, 10,804 pounds per hour of steam are generated in flash tank 100 which flows by way of lines 103 and 76 into the bottom of the regeneration column. As a result of the endothermic steam flashing in tank 100, the water leaving the bottom of tank 100 by line 105 is cooled to 240.1° F. and is conducted to flash tank 104 maintained at a pressure of 15.3 psia. As a result of the reduction in pressure, further steam flashing occurs at the rate of 17,090 pounds per hour of steam which is conducted by lines 107 and 108 to the suction side of compressor 109 where it is compressed to the pressure prevailing at the bottom of regenerator column 51, and introduced into the bottom of the column by line 77. Thus, the total steam generated in the two flash tanks 100 and 104 amounts to 27,895 pounds per hour.

The aqueous condensate from the top of column 51, preheated to a temperature of 210° F., is supplied by line 90 to the direct contactor system at the rate of 11,925 pounds per hour, whereas condensate produced by the condensation of water in the hot feed gas produces 15,970 pounds per hour of the total water requirements of 27,895 pounds per hour.

The remaining stripping steam requirements are supplied by the steam generated in flash tank 71. The hot, regenerated solution collecting at the bottom of regeneration column 51 at a temperature of 248° F. is conducted to flash tank 71 maintained at a pressure of 15.0 psia. Under these conditions, steam flashes from the solution at the rate of 53,790 pounds per hour and the solution cools to a temperature of 220.2° F. The flashed steam is conducted by line 108 to the suction side of compressor 109 where it is compressed to a pressure just above the pressure prevailing at the bottom of the regeneration column 51, and introduced by line 77 as stripping steam.

The solution leaving tank 71 is conducted by recycle pump 74 to the absorber where it is split into two streams, one of which (75% of the total) enters the intermediate portion of the absorber by line 58 at a temperature of 220.2° F. and the second portion (25% of the total) is cooled in cooler 57 to a temperature of 158° F. and enters the top of the absorber by line 56.

Table II below summarizes the results of Example 3 and also shows the results of comparative Example A which, as in conventional processes, produces all of the stripping steam requirements by indirect heat exchange between the hot feed gas and the scrubbing solution in a heat-exchanger system such as that of system 4 in FIG. 1 or system 53 in FIG. 2. In all cases the regeneration heat required is expressed in millions of BTU per hour (MM BTU/hour) assuming a pound of steam is equivalent to 950 BTU.

TABLE II

| | Example A | Example 3 |
|---|---|---|
| Regeneration heat generated by heat exchange system 53 MM BTU/hr. | 143.5 | 60.1 |
| Regeneration heat generated by direct contactor heat exchange system MM BTU/hr. | — | 26.5 |
| Regeneration heat generated in flash tank 71 | | |

TABLE II-continued

|  | Example A | Example 3 |
|---|---|---|
| MM BTU/hr. | — | 51.1 |
| Total regeneration heat required, MM BTU/hr. | 143.5 | 137.7 |
| Temperature of feed gas at inlet to heat-exchange system 53, °F. | 362.1 | 322.6 |
| Heat saved in hot feed gas for other uses, MM BTU/hr. | — | 83.4 |
| Heat saved in hot feed gas as a percentage of total regeneration heat requirements | — | 58.1 |
| Cooling duty of cooler 57 MM BTU/hr. | 45.2 | 28.8 |
| Cooling duty of overhead condenser 84, MM BTU/hr. | 130.1 | 67.7 |
| Solution circulation rate, gallons per minute | 4310 | 3940 |

As may be seen from Table II, the heat saved from the hot feed gas is 83.4 MM BTU/hour equivalent to an increased recovery of 87,790 pounds per hour of steam. This amounts to 58.1% of the total regeneration heat requirements of the conventional system of Example A. Note that the temperature of the hot feed gas entering the scrubbing system is 322.6° F. in Example 3 while a temperature of 362.1° F. is required in Example A. The heat content of the steam-saturated feed gas stream between the temperature levels of 362.1° F. and 322.6° F. is equivalent to the heat savings of 83.4 MM BTU/hour which is conserved for other uses by operation in accordance with the invention. As in Examples 1 and 2, these valuable heat savings are also accompanied by important savings in the duty of the solution cooler (cooler 57 in FIG. 2), the overhead condenser (condenser 84 in FIG. 2) and reduction in the solution circulation rates.

The amount of steam that can be recovered by flashing of the water in indirect heat-exchange system 5 in FIG. 1 or the direct contactor system of FIG. 2 depends on the extent to which the pressure is reduced over the water. The practical limit of heat recovery in this manner is related to the cost of producing the reduction in pressure over the water and subsequently compressing the steam thus generated to the pressure prevailing at the bottom of the regenerator column. The greater the reduction in pressure, the greater is the quantity of steam that will be evolved by flashing; but the power requirements to produce the reduced pressure and to recompress the steam become disproportionately high as the pressure is reduced below levels corresponding to a water boiling point of 180° F. Generally, the practical limits for producing flash steam from the water will correspond to reduced boiling temperatures of from 194° F. to 250° F., and more usually from 200° F. to 220° F. Thus, the indirect heat exchanger 5 in FIG. 1 will generally be operated at pressures of not less than 10 psia (corresponding to a water boiling temperature of 194° F.) and preferably not less than 11.5 psia (corresponding to a water boiling temperature of 200° F.). Similarly, the flash tank 104 of the direct contactor system of FIG. 2 will be subject to the same practical limitations of pressure reduction.

In carrying out the flashing operation on the regenerated solution in flash tank 18 of FIG. 1 and flash tank 71 of FIG. 2, the amount of flash steam evolved will also be dependent on the final pressure over the regenerated solution in the flash tank. In general, the same practical limits for the lower limit of pressure reduction will apply in the case of flashing the regenerated solution as in the case of flashing the water as discussed above.

The amount of heat recovered by flashing of the regenerated solution will also, of course, depend on the temperature of the regenerated solution as it leaves the regeneration column. The higher this temperature in general, the more heat that may be recovered by flashing of the regenerated solution. In most applications, the regeneration column will operate at slightly above atmospheric pressures such that the temperature of the regenerated solution will typically be of the order of 230° F. to 270° F. Under these conditions, and subject to the limitations in the extent to which the pressure can be reduced over the solution, the amount of flash steam that will be produced will generally correspond to a drop in the solution scrubbing temperature (as a result of the endothermic steam flashing) up from about 7° F. to 35° F., and in most cases from 10° F. to 30° F.

In the embodiment shown in FIGS. 1 and 2, the reduction of the pressure over the water and over the regenerated solution is produced by a mechanical compressor which produces the pressure reduction and then compresses the low-pressure steam produced to the pressure prevailing at the bottom of the regeneration column. Other means for producing the pressure reduction and compressing the evolved steam may also be employed such as a steam-ejector system such as that shown in U.S. Pat. No. 3,823,222 of Homer E. Benson. When using a steam ejector system, a supply of high- or medium-pressure steam is supplied to the ejector as motive steam which produces the reduced pressure and compresses the mixture of motive and flasn steam to the pressure prevailing in the regenerator column. When using the steam ejector system, some of the steam-stripping requirements will be supplied by the motive steam. The choice between a mechanical compressor system as shown in FIGS. 1 and 2 and alternate means such as a steam ejector will depend on a variety of considerations such as the relative capital cost, the availability of suitable motive steam, water balance considerations, and others.

As pointed out previously, it is advantageous to supply the water to be employed for direct or indirect heat exchange against the hot feed gas from water which is produced in the course of the scrubbing process. When employing an indirect heat exchange between the water and the hot feed gas such as heat-exchanger system 5 in FIG. 1, it is highly preferred to employ preheated aqueous condensate which is produced by condensation of the overhead vapors from the regenerator. The preheating of the condensate at the top of the regenerator increases heat efficiency. Another advantage is that the necessity for providing an outside source of treated boiler feed water is eliminated. The aqueous condensate from the overhead condenser may be contaminated with components of the scrubbing solution, but is nevertheless suitable for reuse in the scrubbing system, itself, since the contaminants are thus kept within the scrubbing system.

When using a direct contactor system such as shown in FIG. 2 for exchanging heat between the hot process gas and the water, a portion of the aqueous condensate is automatically produced from the steam condensing from the hot feed gas in direct contactor 54. This source of condensate may be supplemented by condensate from the overhead condenser of the regenerator as illustrated in FIG. 2. Here again, the generation of the required water from aqueous condensate produced within the scrubbing system, itself, eliminates the need for providing pretreated boiler feed water.

In the system of FIG. 1, still further quantities of low-level heat may be recovered from the hot condensate condensing from the process gas which collects in the knockout pot 43A. The condensate leaving knockout pot 43A may be introduced into a separate flash tank (not shown) with a suitable pressure letdown valve between the knockout pot and the flash tank. The flash tank receiving the hot condensate is connected to the suction side of the compressor 45 which results in reduction of the pressure over the condensate to a pressure lower than that at the bottom of the regenerator 51, whereby low-pressure steam flashes off from the hot condensate and, after compression in compressor 45, is fed into the bottom of the regenerator through line 22 together with compressed steam raised in heat-exchange system 5 and flash tank 18.

In the system of FIG. 2, additional quantities of condensate from the hot process gas can be fed to direct-contact tower 54 by eliminating knockout pot 97, thus carrying the condensate otherwise removed in knockout pot 97 to the direct-contact tower 54 and recovering additional heat from this condensate. In that event, the condensate from the hot process will produce a greater proportion of the total water needed to supply the requirements of flash tanks 100 and 104, correspondingly reducing the amount of condensate supplied by line 90 from the top of the regenerator 51.

The invention, of course, is not limited to the specific embodiments shown. It may be applied to other types of scrubbing systems than those specifically illustrated. For example, all of the scrubbing solution may enter the absorber at the top of the column with or without cooling rather than in two separate streams as shown in FIGS. 1 and 2. Likewise, a so-called two-stage regenerator may be employed in which a portion of the scrubbing solution is subjected to an intermediate degree of regeneration (i.e. leaving a higher proportion of absorbed gases in the solution) while a smaller fraction of the solution is subjected to additional steam-stripping to produce a more thoroughly regenerated scrubbing solution such as the system shown in FIG. 7 of U.S. Pat. No. 2,886,405.

We claim:

1. In a cyclic process for the removal of acid gases from a feed gas stream consisting of a hot, steam-containing gas mixture by means of an aqueous alkaline scrubbing solution which is continuously recycled between an absorption stage in which said acid gases are absorbed by said scrubbing solution and a regeneration stage in which said acid gases are desorbed by steam-stripping, and in which said stripping steam is at least partially derived from said hot, steam-containing feed gas, an improved method for maximizing heat recovery from said feed gas and thereby increasing the thermal efficiency of said regeneration stage comprising the steps of
   (a) passing said feed gas in indirect heat exchange with said scrubbing solution, thereby heating said solution and producing steam;
   (b) utilizing the steam produced in step (a) as stripping steam for regenerating said solution;
   (c) utilizing the partially cooled feed gas from step (a) to heat water in a heat exchange system separate from that employed in step (a);
   (d) reducing the pressure over the water heated in step (c), thus reducing the boiling temperature of said water and producing steam at a pressure lower than the pressure in said regeneration stage and bringing the cooled water resulting from said pressure reduction into heat-exchange relationship with said feed gas, thus further cooling said feed gas;
   (e) compressing the low-pressure steam produced in step (d) to at least the pressure in said regeneration stage and utilizing such compressed steam as stripping steam for regenerating said solution;
   (f) passing the cooled feed gas from step (d) to said absorption stage for removal of acid gases therefrom.

2. A process in accordance with claim 1 wherein the water employed in steps (c) and (d) is provided at least in part by aqueous condensate produced in the course of said scrubbing process.

3. A process in accordance with claim 1 wherein the heat exchanger in step (c) is an indirect heat exchange system in which the hot feed gas is brought into indirect heat exchange with said water.

4. A process in accordance with claim 1 in which the heat exchanger in step (c) is a direct-contact heat exchange system in which the hot feed gas is brought into direct contact with cooled water resulting from said pressure reduction over said water.

5. A method in accordance with claim 1 in which the scrubbing solution comprises an aqueous solution of potassium carbonate.

6. A method in accordance with claim 1 in which the absorption stage is conducted at a substantial superatmospheric pressure and in which the temperatures in the absorption stage are close to those in the regeneration stage.

7. In a cyclic process for the removal of acid gases from a feed gas stream consisting of a hot, steam-containing gas mixture by means of an aqueous alkaline scrubbing solution which is continuously recycled between an absorption stage in which said acid gases are absorbed by said scrubbing solution and a regeneration stage in which said acid gases are desorbed by steam-stripping, and in which said stripping steam is at least partially derived from said hot, steam-containing feed gas, an improved method for maximizing heat recovery from said feed gas and thereby increasing the thermal efficiency of said regeneration stage comprising the steps of
   (a) passing said feed gas in indirect heat exchange with said scrubbing solution, thereby heating said solution and producing steam;
   (b) utilizing the steam produced in step (a) as stripping steam for regenerating said solution.
   (c) utilizing the partially cooled feed gas from step (a) to heat water in a heat exchange system separate from that employed in step (a);
   (d) reducing the pressure over the water heated in step (c), thus reducing the boiling temperature of said water and producing steam at a pressure lower than the pressure in said regeneration stage and bringing the cooled water resulting from said pressure reduction into heat-exchange relationship with said feed gas, thus further cooling said feed gas;
   (e) reducing the pressure over the hot, regenerated solution in a flashing zone, thereby producing steam at a pressure lower than the pressure in said regeneration stage with concomitant cooling of said solution, and passing the cooled solution to said absorption zone;

(f) compressing the low-pressure steam produced in steps (d) and (e) to at least the pressure in said regeneration stage and utilizing such compressed steam as stripping steam for regenerating said solution;

(g) passing the cooled feed gas from step (d) to said absorption stage for removal of acid gases therefrom.

8. A process in accordance with claim 7 wherein the water employed in steps (c) and (d) is provided at least in part by aqueous condensate produced in the course of said scrubbing process.

9. A process in accordance with claim 7 wherein the heat exchange system in step (c) is an indirect heat exchange system in which the hot feed gas is brought into indirect heat exchange with said water.

10. A process in accordance with claim 7 in which the heat exchange system in step (c) is a direct contact heat exchange system in which the hot feed gas is brought into direct contact with cooled water resulting from said pressure reduction over said water.

11. A method in accordance with claim 7 in which the scrubbing solution comprises an aqueous solution of potassium carbonate.

12. A method in accordance with claim 7 in which the absorption stage is conducted at a substantial superatmospheric pressure and in which the temperatures in the absorption stage are close to those in the regeneration stage.

* * * * *